(12) United States Patent
Ling et al.

(10) Patent No.: US 7,190,352 B2
(45) Date of Patent: Mar. 13, 2007

(54) METHOD AND APPARATUS OF ELECTROTACTILE PANEL WITH POINTING SYSTEM

(75) Inventors: Shou-Hung Welkin Ling, Burnaby (CA); Chi-Chia Chang, Taipei (TW); Wei-Chih Liao, Taipei (TW); Wan-Chih Lin, Taipei (TW)

(73) Assignee: Ownway Biotronics Inc., Hsinchu (TW)

( * ) Notice: Subject to any disclaimer, the term of this patent is extended or adjusted under 35 U.S.C. 154(b) by 0 days.

(21) Appl. No.: 10/284,265

(22) Filed: Oct. 31, 2002

(65) Prior Publication Data

US 2004/0095330 A1 May 20, 2004

(51) Int. Cl.
*G09G 5/00* (2006.01)

(52) U.S. Cl. .................. 345/173; 345/174; 349/143

(58) Field of Classification Search ........ 358/1.1–1.19; 345/173, 174; 349/139, 111, 122, 123, 128, 349/129, 132, 138, 143, 145, 149, 197, 199
See application file for complete search history.

(56) References Cited

U.S. PATENT DOCUMENTS 4,692,797 A * 9/1987 Matsumoto .................. 358/506
4,700,025 A * 10/1987 Hatayama et al. .......... 200/5 A
5,181,030 A * 1/1993 Itaya et al. ................... 341/20
5,869,791 A * 2/1999 Young ..................... 178/20.01
6,057,903 A * 5/2000 Colgan et al. .............. 349/139
6,380,497 B1 * 4/2002 Hashimoto et al. ......... 200/5 A
6,552,718 B2 * 4/2003 Ahn et al. .................. 345/173

* cited by examiner

*Primary Examiner*—King Y. Poon
(74) *Attorney, Agent, or Firm*—Troxell Law Office PLLC (57) ABSTRACT

An electro-tactile panel (ETP) apparatus for a display panel is disclosed. The ETP apparatus is composed of three major parts: a controller, a panel, and a holder. The panel consists of four layer made of transparent material. The first layer is an insulating substrate, the second layer is a conductive layer formed of a plurality of horizontal electrodes on the first layer. The third layer is an insulating layer having holes formed therein, which corresponding to the electrodes on the second layer. The fourth layer is a conductive layer formed of a plurality of vertical electrodes on the third layer. The panel is attached to the display panel by means of the holder apparatus. The electro-tactile signal and cursor position is process by the controller when the skin touches the panel so that some positions of the vertical electrodes and horizontal electrodes are electrically connected through the holes.

11 Claims, 9 Drawing Sheets

FIG. 5

METHOD AND APPARATUS OF ELECTROTACTILE PANEL WITH POINTING SYSTEM

BACKGROUND OF THE INVENTION

1. Field of the Invention

The present invention relates to an electro-tactile panel apparatus, and more particularly to an electro-tactile panel apparatus with a four-layer panel structure, a holder to fasten themselves to a display panel and a controller so that the electro-tactile panel can provide electro-tactile sensation and cursor system for user.

2. Description of the Prior Art

An ETD (Electro-Tactile Device) is a kind of tactile device, which will apply electrical energy to the skin in order to stimulate the nerve axon of mechanoreceptors, and then generate tactile sensation (sense of touch). Recently, many research reports show that the tactus is capable of being generated by means of current stimulating the nerve axon of mechanoreceptors of the skin. Of all methods for tactile actuator, the method of current stimulation may be the most simple and efficiency one among them.

One prior art related to the tactile display is U.S. Pat. No. 5,977,867 with the title "Touch pad panel with tactile feedback." The patent disclosed a touch pad or a touch screen attached with one or more vibrator to produce a tactile feedback sensed by the user as the pad or screen is touched with a finger or a pointer. However, the vibrations generated by the vibrator do not occur locally but a whole system. It can not provide the user with various tactile feedback in response to different dots or press Other related one is U.S. Pub. No.: US2002/003469, with the title "Internet Browser Facility and Method for the Visually impaired." The patent proposed a matrix type movable tactile elements for those visually-impaired users. The display panel is similar to Braille dot set to provide a readable panel, which is divided into three portions: Index Frame, Content Frame, and Button frame. Each of them provides different attributes. The contents frame displayed a Braille-translated version of a browsing Web page or text. The index frame includes several symbols for browsing commands. However, to constitute such a tactile feedback display panel, a great number of pressure or pressure-sensing transducers are demanded. Consequently, the cost for these tactile elements is rather sizeable. Moreover, the display provides merely Braille dot format for text and a simplified dot matrix image or line drawing for the graphical image. The actuator is one bit only, either raised or down the dot which equivalents to a black-white display.

Another related one is proposed by Heidelberg university in Germany. The paper disclosed that the tactile could be generated in terms of pin array. The display information is presented by pin actuator. The user can acquire the display information such as the shapes or profile of the image through the pin array touched. The interface utilizes a small number of actuator accompany with XY glide panel to transform the display information to tactile sensation. However, the tactile levers are not clarity due to the actuator restriction. The apparatus is much complicated too.

SUMMARY OF THE INVENTION

An object of the present invention is to provide an ETP apparatus

The invention disclosed herein is an electro-tactile panel (ETP) apparatus for a display panel. The ETP apparatus is composed of three major parts: a controller, a panel, and a holder. The panel consists of four layer made of transparent material. The first layer is an Insulating substrate, the second layer is a conductive layer formed of a plurality of horizontal electrodes on the first layer. The third layer is an insulating layer having holes formed therein, which corresponding to the electrodes on the second layer. The fourth layer is a conductive layer formed of a plurality of vertical electrodes on the third layer. The panel is attached to the display panel by means of the holder apparatus. The electro-tactile signal and cursor position is process by the controller when the skin touches the panel so that some positions of the vertical electrodes and horizontal electrodes are electrically connected through the holes.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

Figure 1:
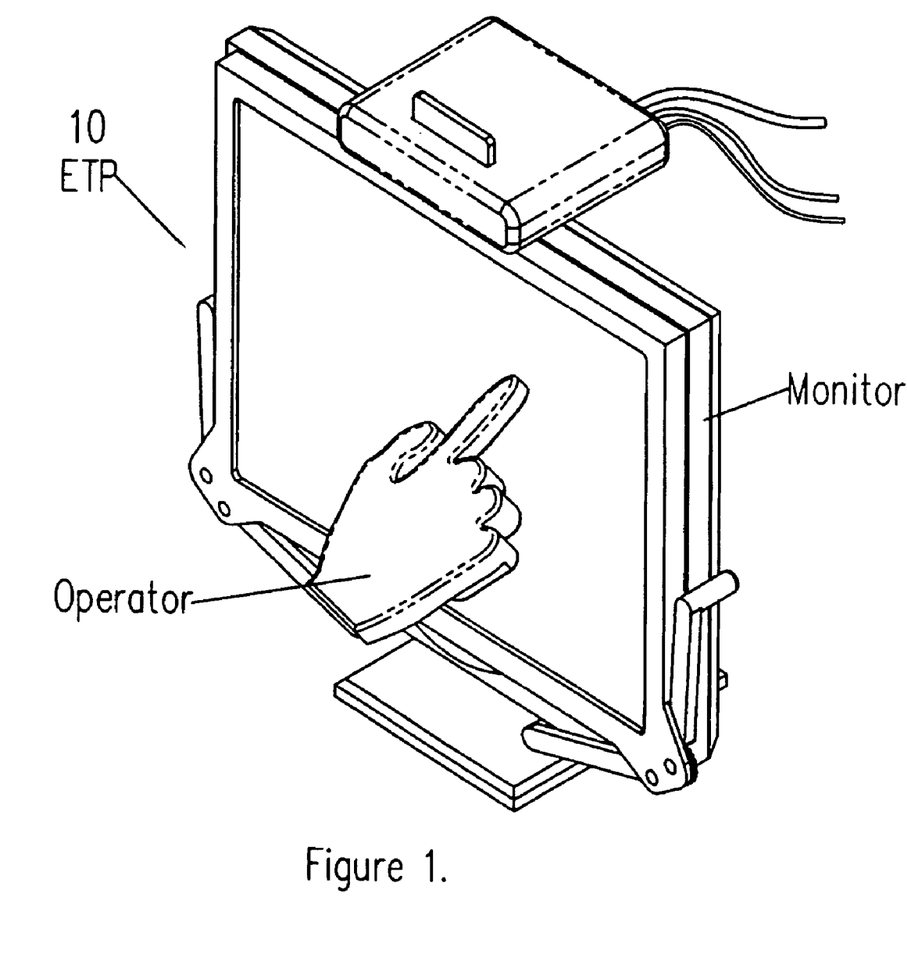
FIG. 1 is the situation, a user operate the ETP apparatus.
Figure 2:
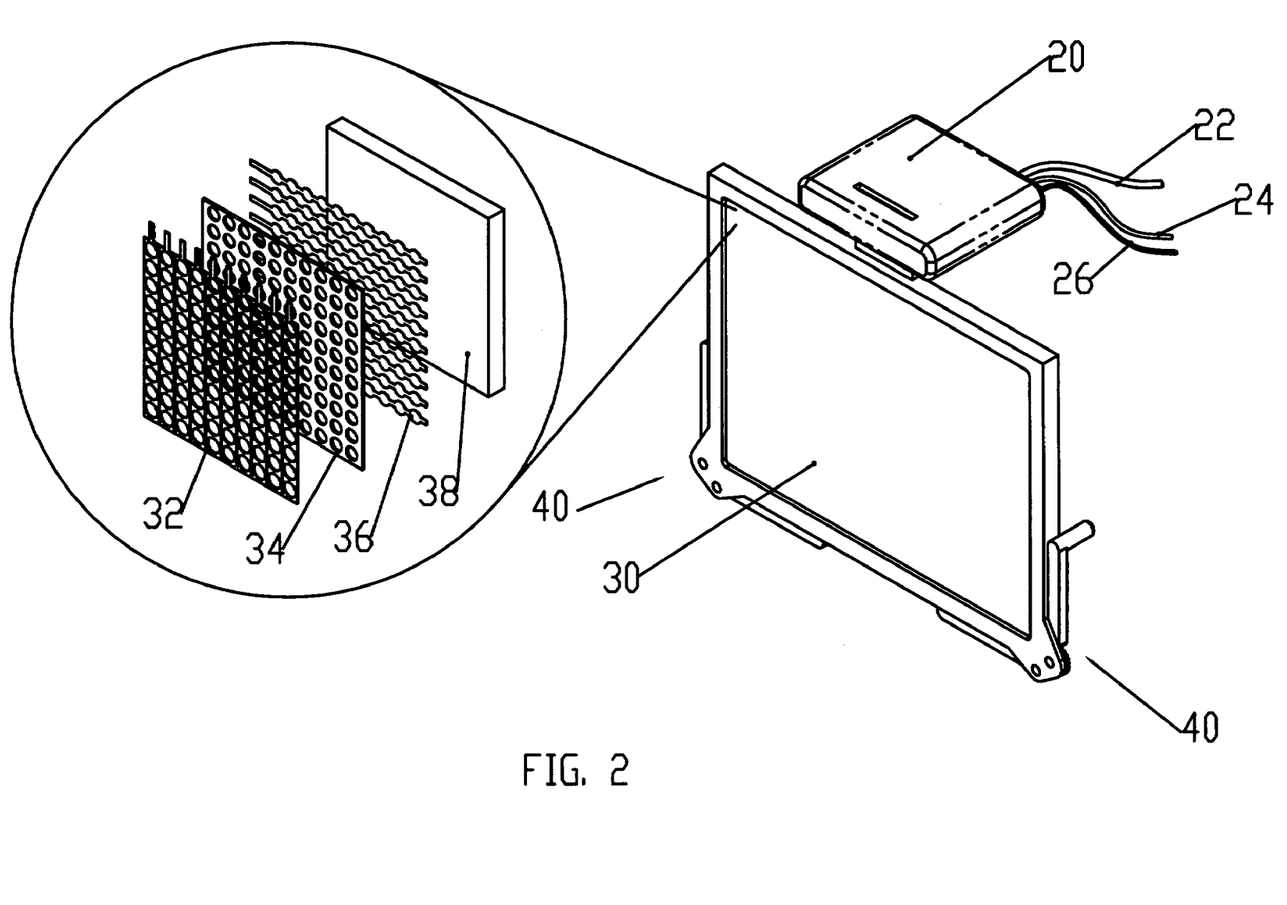
FIG. 2 illustrates the major part of the ETP apparatus according to the present invention.

FIG. 1 illustrates the situation for a user who operates the ETP panel after ETP apparatus 10 is set up. The user can directly handle the display information just using his or her finger touching the panel. The ETP apparatus is in response to the user by outputting both tactile feedback signals and a cursor system. The ETP apparatus comprises three major parts: a controller 20, a panel 30 and a holder 40, as shown in FIG.2. The panel 30 is installed upon the front of the screen by using the holder 40 fastening to the display body. The detailed is depicted as follows:

The controller 20 is provided for retrieving the image information, which is the same data as the VGA display adaptor card retrieved. After retrieving the image information, the controller 20 processes and transform them into electro-tactile information to the panel 30.The user can have sensation of tactile due to current stimulated while the user touches the panel 30. The detector circuit of the controller 20 detects the skin touched position and transform into cursor position thereof feed into cursor system of the computer.

Figure 3A:
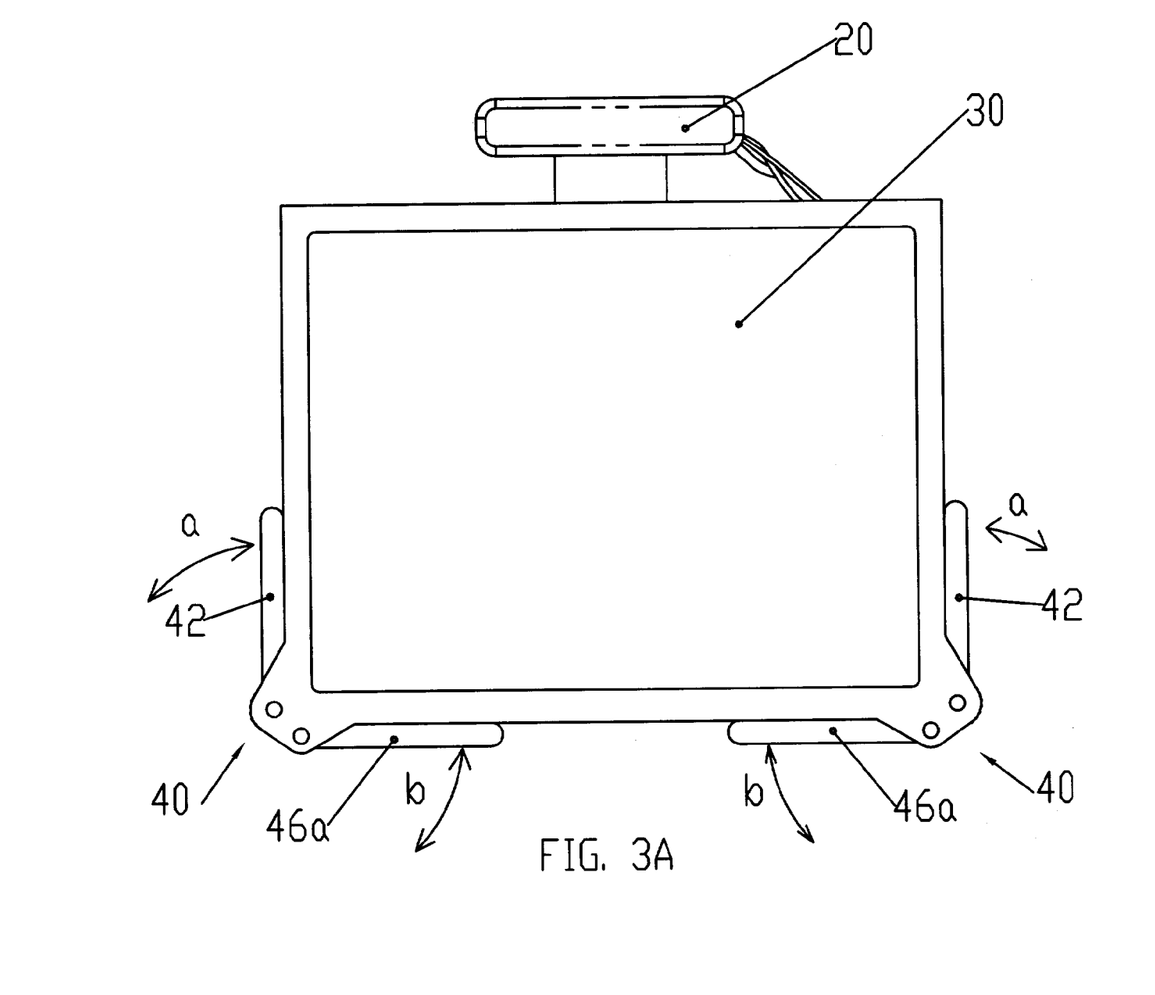
FIG. 3A illustrates a front view when the ETP apparatus is set up according to the present invention.
Figure 3B:
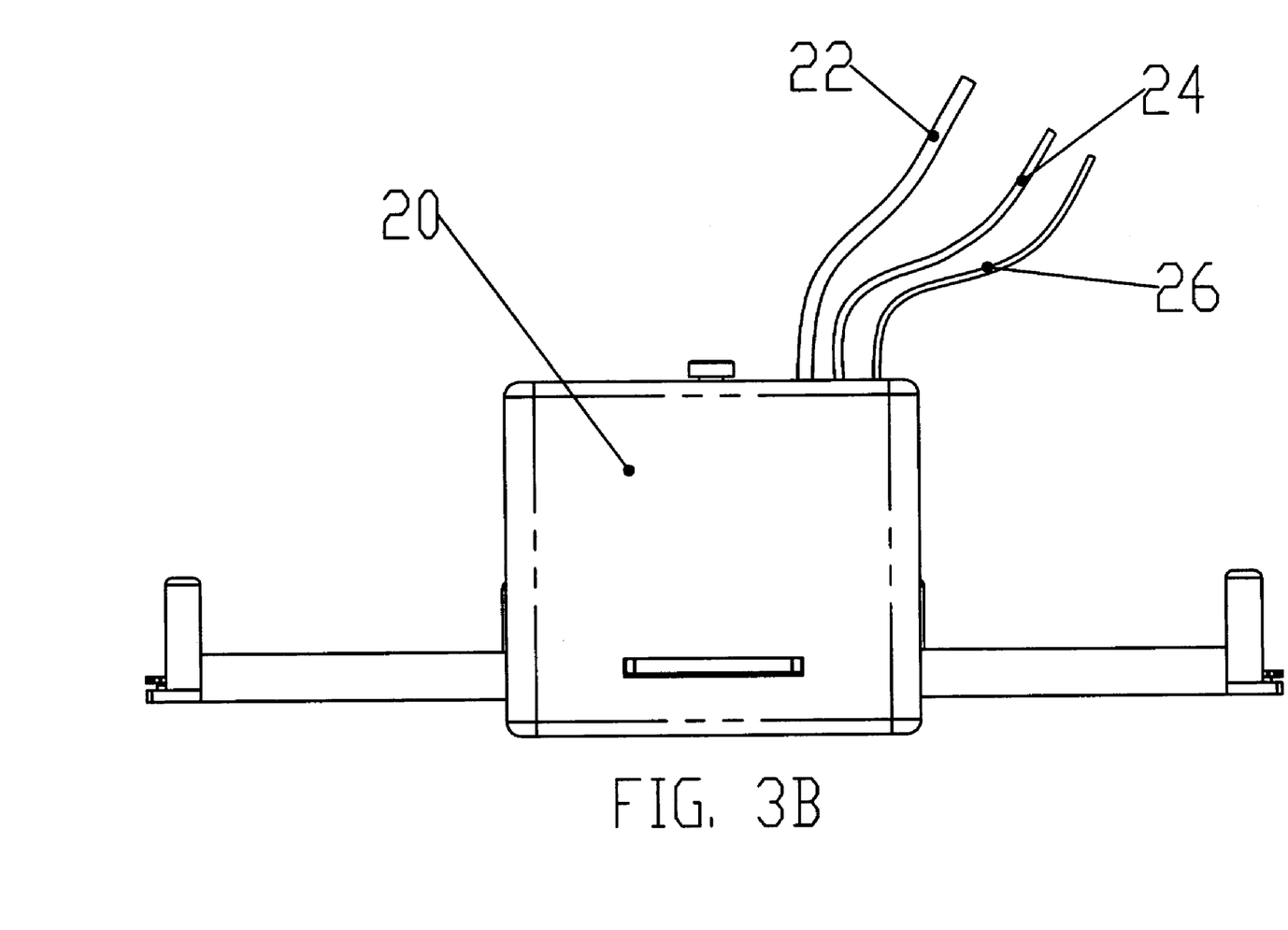
FIG. 3B illustrates the detail of the controller according to the present invention.
Figure 3C:
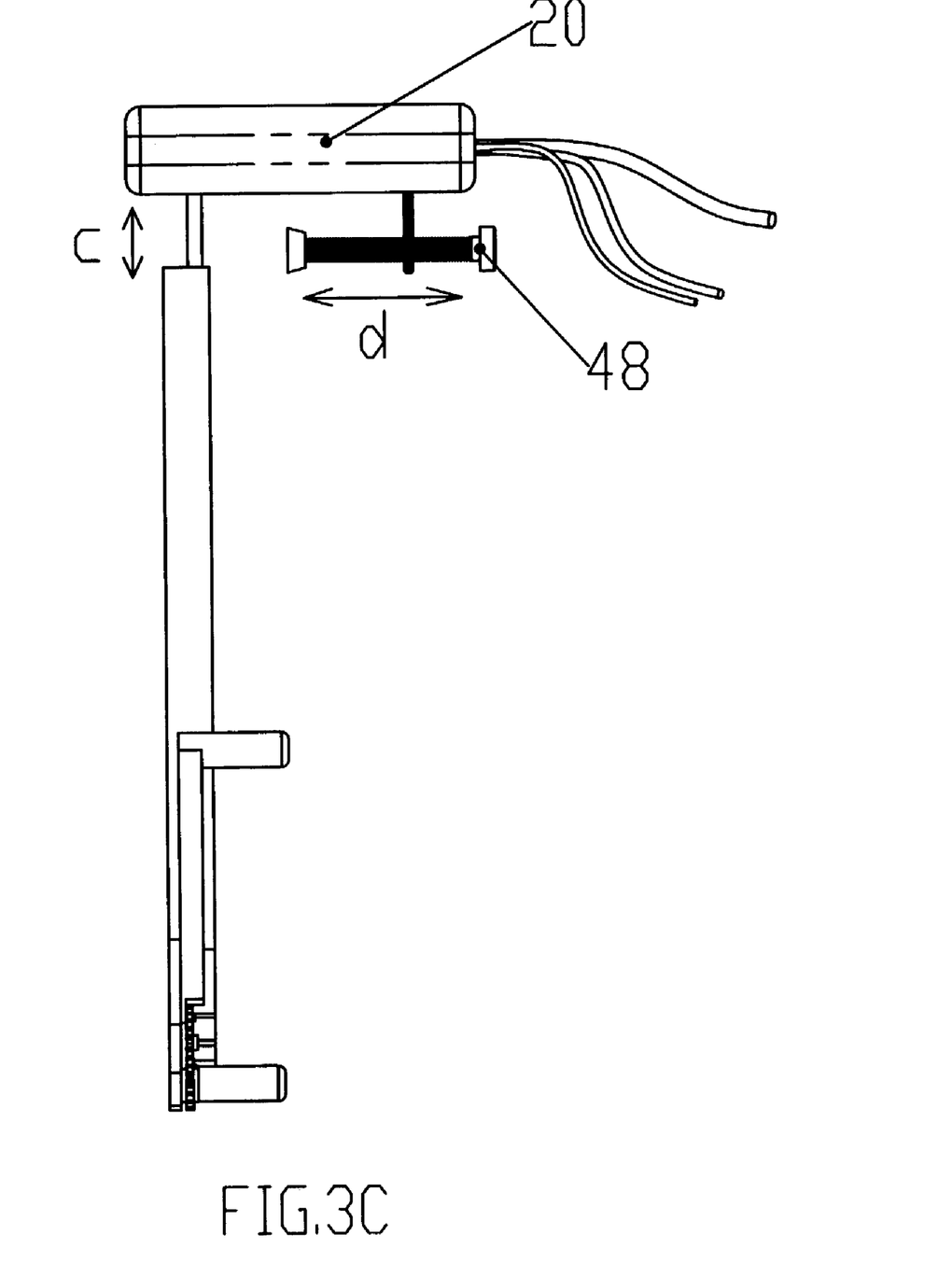
FIG. 3C illustrates the detail of an adjustable fixation apparatus for the controller according to the present invention.
Figure 3D:
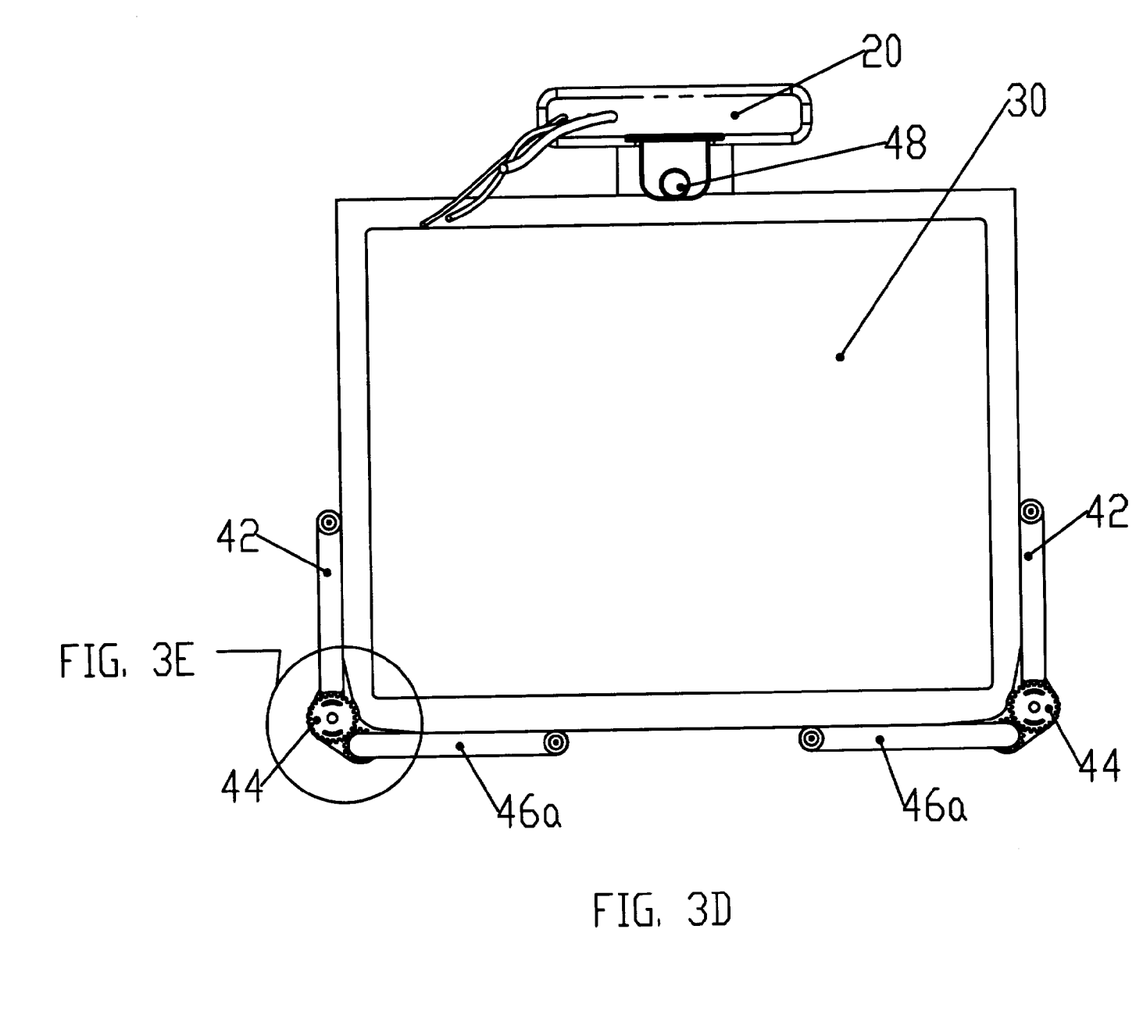
FIG. 3D illustrates the detail of the holder according to the present invention.

The controller 20 is fastened to the backside of the display and its altitude with respect to the panel 30 is adjustable by means of an adjustable bolt 48 underneath the controller 20. The power input to the controller 20 is through an exterior power 22 due to account for the panel might require special current or voltage to ensure the input power for ETP. The image information feed into controller 20 comes from the signal input terminal 24. The image information comes from the signal input terminal 24. The image information comes from the same VGA signal as the VGA adaptor card received provided by a computer by a signal splitter, which outputs to the screen of the LCD (liquid crystal display) or the CRT (cathode ray tube display) simultaneously. The screen of the LCD or the CRT displays normal image information but the controller 20 of the ETP provides with current stimulation information and feed back the computer with cursor position by signal wire 26 (can be USB (universal series bus) interface or RS 232 interface). Certainly, the VGA signal transferred either inputting or outputting can be through a conductive wire or wireless.

Data Process

Figure 5:
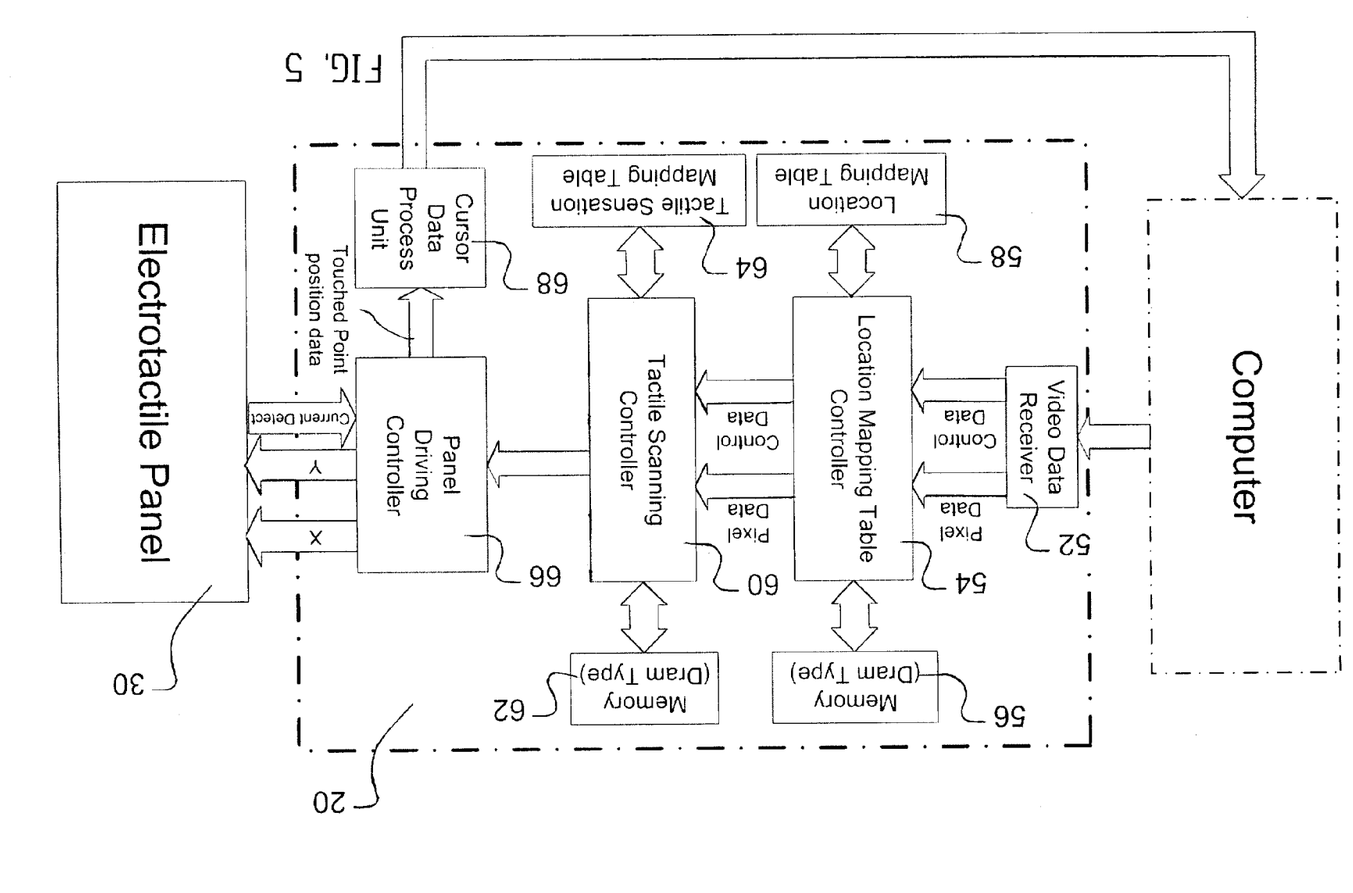
FIG. 5 illustrates the detail of the controller architecture according to the present invention.

Referring to FIG. 5, illustrates system architecture of electro-tactile feedback panel. The video data receiver 52 of the controller 20 receives the display information, which includes pixel information and control information, and then transfers to the location mapping table controller 54 for data mapping treatment. The location mapping table controller 54 with the location mapping table 58 stored in the EEPROM IC. and the DRAM IC 56 to support processing the display information. This is due to the facts that the pitch of the pixels is in a range between about 0.2 to 0.3 mm. However, for the electro-tactile display, the spatial resolution does not need to have such value. Based on the reports of the recent research paper and related dissertation, the pixel pitch of the electro-tactile feedback system is between about 2 to 3 mm. Consequently, as the tactile sensation is concerned, the resolution does not demand to have a high resolution as high as the monitor.

The outputting data from the location mapping table controller 54 are then feed into tactile scanning controller 60 to generate tactile sensation data. The tactile scanning controller 60 has tactile sensation mapping table 64 stored in the EEPROM IC. and the DRAM IC 62 to auxiliary the tactile scanning controller 60 to handle the location mapping data. After the tactile sensation data generated, they then are feed into panel-driving controller 66. The panel-driving controller 66 then outputs the electrical energy to the corresponding position of the panel 30 touched by skin using current pulses with specific magnitude and frequency to stimulate the nerve axon of mechanoreceptors as well as output touch panel position data to the cursor- data process unit 68 to process. The cursor data are then feedback to the computer.

To Determine the Cursor Position

By means of the current (or voltage difference) detection, the position is to be detected by the controller 20 while scanning to the position where the position contents at least one pixel and becomes conduction due to skin touch. Consequently, panel 30 of the ETP apparatus can be served as a touch panel too. What the ETP apparatus provided not only an electro-tactile apparatus but also a cursor position system. As description before, while the panel driving controller 66 of the controller 20 outputs the stimulated current, the pixel is also being detected if it is conducted, which is judged by detecting the doubted current deducting a predetermined critical value. The position is said to be touched if the doubled current is higher than that of the predetermined critical value. This approaching is to filter or to skip some of the minor touched points so as to alleviate some desired cursor position calculation.

The resolution of either horizontal scanning line or vertical scanning is much small than that of the conventional LCD or CRT. As a result, to acquire the cursor position where the finger touched should have processed a particular operation. Since the area touched by a finger's tip usually covers several scanned pixels, the corresponding pixels detected by having current would contain over one, typical, the value for a tip of finger is about 14 to 17 pixel. Hence, the controller 20 of ETP apparatus will take the area/s mass center of those detected pixels covered to be as a current cursor position feedback to the computer. Accordingly, the calculated cursor position would not be affected by the resolution of the resolution of the ETP so as to enhance cursor resolution.

Panel

Figure 4:
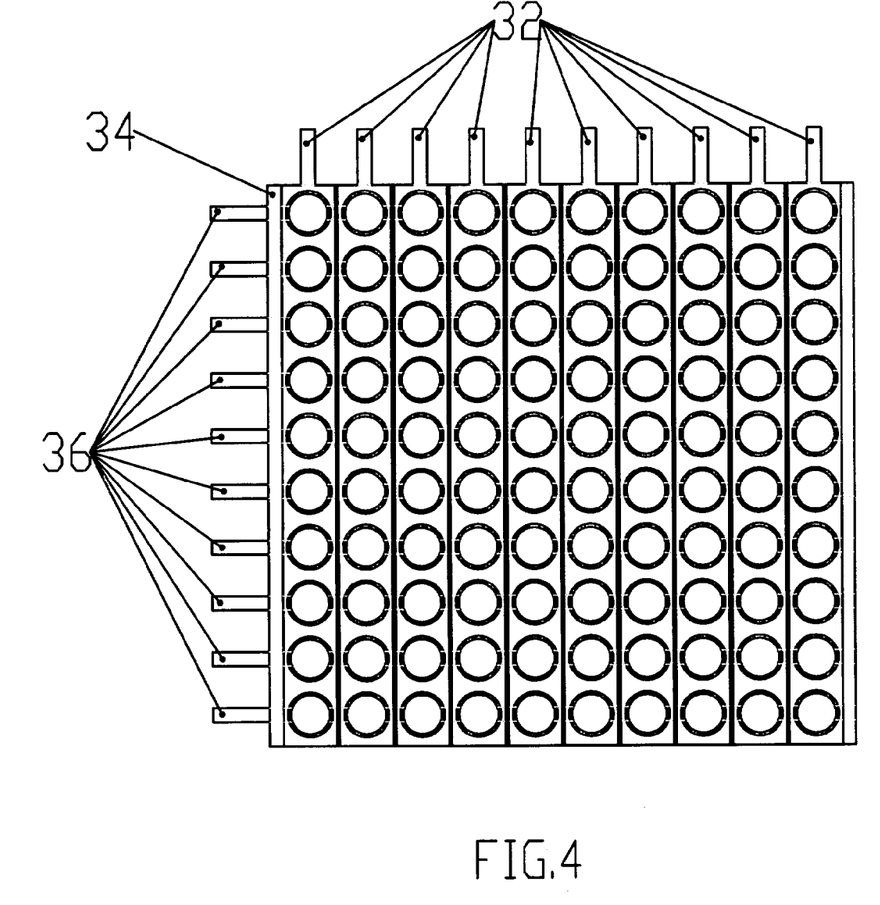
FIG. 4 illustrates the four layer stacked structure of the panel according to the present invention.

The panel 30 is a physical outputting apparatus. The panel 30 essentially consists of four layers. The first layer 38 is an insulating substrate, which is a transparent layer. The second layer 36 is a transparent conductive layer formed on the insulating substrate. The second layer 36 is formed of n first (or said horizontal) electrodes arranged in parallel, and each is like having m plates arranged in a line and with edges thereof connected by a slat, where n, and m are natural numbers. Thus, the second layer has n×m plates in total. The third layer 34 is an insulating layer having an array of n×m first holes formed therein, wherein the n—m first holes locate at positions one to one corresponding to the n×m plates. The fourth layer 32 is also a transparent conductive layer formed on the third layer 34. The fourth layer 32 is composed of m vertical electrodes arranged in parallel each other. Moreover, each second (or said vertical) electrode is a slat like and has an array of 1×n second holes formed therein. Thus on the fourth layer 32, there are n×m second holes in total one to one corresponding to the n×m plates. By means of the opening formed in the insulating layer 34, the horizontal electrodes and the vertical electrodes can be electrically connected when a person with his or her skin touches the outermost layer 32.

Holder Apparatus

The ETP apparatus is designed for LCD or CRT display. The ETP apparatus must be mounted to the display with somewhat robust so that it can fix well without any shifting to against user's finger's rubs frequently on the panel 30. Otherwise, the corresponding positions will lost their fidelity. The frame sizes of the displays, however, are various with the factories even though the panel size for LCD or CRT has been normalized. For instance, the panel sizes may have 12.1, 13.3', 14.1', 15', 17', etc.

Based foregoing reasons, for same size, the design of the ETP apparatus must be apt to various frame width and thickness in respond to products manufacture from different factories.

The adjustment with fixation of the controller 20 on the upper side and the back side of the monitor are, respectively, utilized the spacing c and d adjustment by means of bolts. The spacing c is large or small relays on the frame width of the monitor so that the panel 30 of the ETP can correct corresponding well to the screen of the monitor. In addition, the freedom of degree, spacing d, can be adjusted by screwing the bolt 48 to cater to different thickness of the monitor.

Under the left-down corner and the right-down corner of the panel 30 are two sets of fixed mechanisms. Each is composed of three parts: a first bar 42, first gear 44, and a second bar 46a with a second gear 46b, the first bar 42 is fastened to the first gear 44 with a centered axis 50. The first gear 44 has two arc-shaped slots 45a and 45b formed therein and with positions substantially mirrored about the centered axis 50. The first bar 42 has two pins 43a, 43b formed thereon and located at positions corresponding to the slots 45a and 45b, respectively, so that the two pins are protruding the slots 45a and 45b while the first bar 42 are fastened to the first gear 44. The pins 43a and 43b slide along the slots 45a and 45b such that the first bar 42 with respect to the first gear 44 can have angle x and angle y spacing to rotate, as shown in FIG. 3E.

Figure 3E:
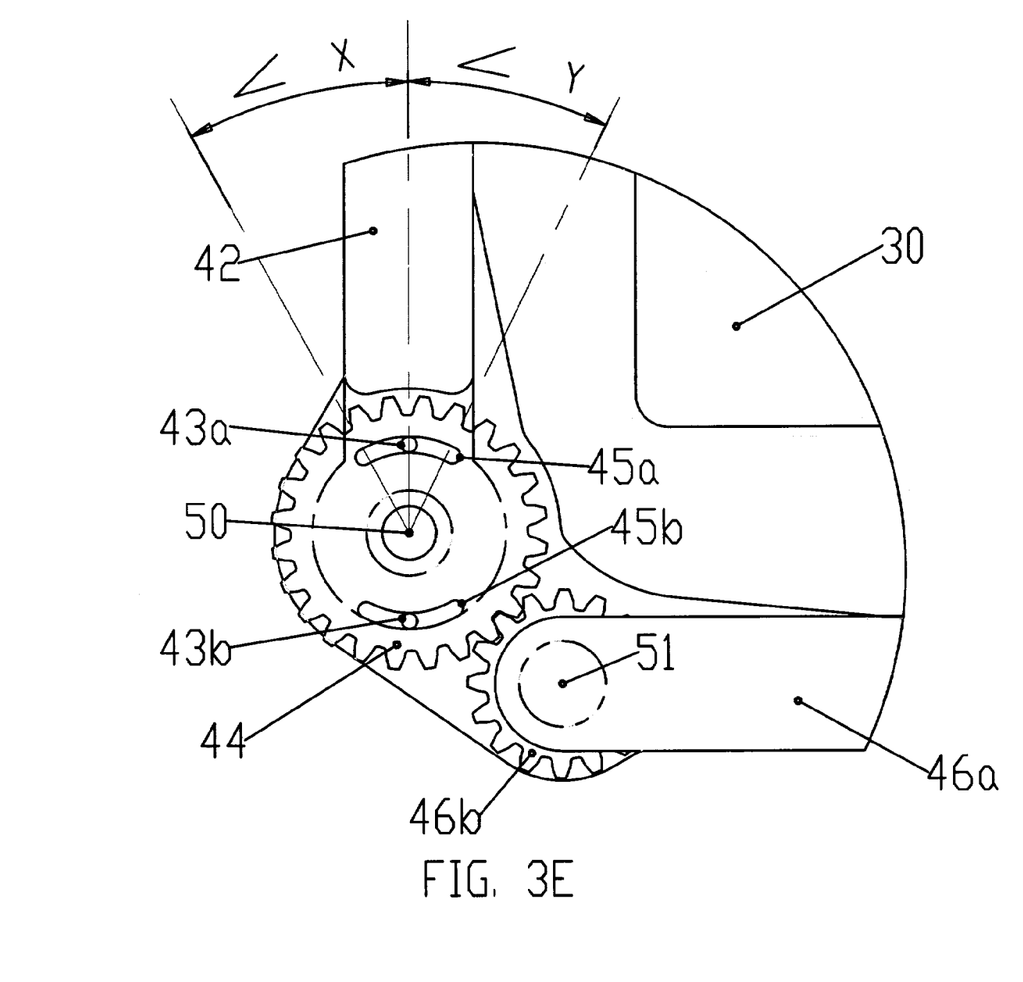
FIG. 3E illustrates the detail of the two set of the fixed apparatus of holder mount the panel to the monitor according to the present invention.

Still referring to FIG. 3E, the second bar 46a with one end terminal mounted to centered portion of the second gear 46b by an axis 51. The second gear, 46b is, however, fixed on the second bar 46a and clenched to the first gear 44. Preferably, the second gear 46b can be directly formed on the end terminal of the second bar 46a as an unity. The first gear 44 does not rotate until the first bar 42 is pulled out and in an outward direction with a spanned angle about the centered axis 50 is larger than angle X. In the situation of spanned angle larger than angle X, the first gear 44a begins to rotate and in response to the first gear 44, the second gear 46b makes the second bar 46a moves downward about axis 51.

To install the ETP apparatus on the monitor, the steps are as follows:

pulling two first bar 42 of the fixed set apparatus in an outward direction about axis centered axis 50 until the fixed set apparatus can enclosed the monitor.

after the ETP apparatus is attached to the monitor, release two first bars 42, the first bars 42 and the second bars 46a are then bounce-back automatically.

adjusting the position of the panel 30 so as to respond to the position of screen.

screwing up the bolt 48 to implement the ETP apparatus installation.

connecting the power wire 22 and signal wires 24, 26.

The magnitude of angle X and angle Y is in response to the difference between two frame sides (left-hand and right-hand side) and the frame bottom. The angle X is designed for the width of two frame sides is larger than the width of the frame bottom. As the spanned angle is sufficient large, the first bars 42 and the second bars 46 begin bounce-back. The second bars 46 will contact to the frame bottom firstly. Afterward, by means of angle X, the first bars 42 bounce-back continues until the first bars 42 contact to the frame sides. The function of angle Y is designed for the width of the frame bottom is larger than the width of the two frame sides.

According to the present invention, the ETP apparatus is an appended apparatus, it does not need to modify the monitor or software. It utilizes the original image information as the source of the electro-tactile panel. The cursor information obtained from the panel 30 is feedback to the computer in terms of the original cursor system and interface thereof. Hence, it does not need to modify the hardware.

What's more, the user can have additional sensation, which can supplementary some feeling that the sensory organ does not have. For a visually impaired user, the ETP provided him or her with a practical utility and communication interface. The user can operate the computer by means of the ETP apparatus without extra design.

As is understood by a person skilled in the art, the foregoing preferred embodiment of the present invention is an illustration of the present invention rather than limiting thereon. It is intended to cover various modifications and similar arrangements included within the spirit and scope of the appended claims, the scope of which should be accorded the broadest interpretation so as to encompass all such modifications and similar structure.

What is claimed is:

1. An electro-tactile panel apparatus for a display panel, said electro-tactile panel comprising:

a first insulating substrate;

a second conductive layer formed on said first insulating substrate, wherein said second conductive layer is formed of n first electrodes arranged in parallel, and each of said first electrodes has m plates arranged in a line and the edges between the electrodes are connected by a slat to form n×m plates in total on said second conductive layer, said n and m are nature numbers;

a third insulating layer having an array of n×m first holes formed therein, wherein said n×m first holes locate at positions one to one corresponding to said n×m plates;

a fourth conductive layer formed on said third insulating layer, wherein said fourth conductive layer is composed of m second electrodes arranged in parallel each other and in perpendicular to said first electrodes furthermore, each said second electrode is a slat and has an array of 1×n second holes formed therein, and hence on fourth conductive layer has n×m second holes in total corresponding to said n×m plates;

said fourth conductive layer has n×m second holes corresponding to said n×m first holes, wherein said first insulating substrate, said second conductive layer, said third insulating layer, and said fourth conductive layer are made of transparent material;

a holder bound said third insulating layer at an outer plane and said first insulating substrate at inner plane together to said display; and a controller installed on a sidewall position of said display, wherein said controller receiving display information and electrically coupled with said first electrodes and said second electrodes to provide a skin stimulated current when a person touches said fourth conductive layer thereto connect at least one of said first electrodes and one of said second electrodes simultaneously with his or her skin.

2. The electro-tactile panel apparatus according to claim 1, wherein said holder comprises two sets of fixed mechanisms for said holder fixed on said display panel.

3. The electro-tactile panel apparatus according to claim 2, wherein each of said two sets of fixed mechanisms comprises a first bar, a first gear, a second gear, and a second bar, furthermore, said first bar has a first pin and a second pin and said first gear has a first slot and a second slot, and still said first bar couples with said first gear by fastening with a first axis and putting said first, and second pin, respectively, into said first slot and said second slot so that said first and second pin can slide, respectively, along said first and second slot, moreover said second gear is fixed on or formed on one end terminal of said second bar as an unity.

4. The electro-tactile panel apparatus according to claim 3, wherein said two sets of fixed mechanisms are, respectively, fastened at a left corner and a right corner of said display panel.

5. The electro-tactile panel apparatus according to claim 3, wherein said first gear clenches said second gear with teeth thereof.

6. The electro-tactile panel apparatus according to claim 5, wherein said first bar normally is set along vertical side of said display panel and said second bar normally is set along horizontal side of said display panel.

7. The electro-tactile panel apparatus according to claim 6, wherein said second gear isn't in response to said first gear until said first bar moves outward a first angle with respect to said first axis, as a result, said second bar moves downward a second angle with respect to said second axis.

8. The electro-tactile panel apparatus according to claim 6, wherein said first bar moves outward a first angle and said second bar moves downward a second angle are to install said holder on sidewalls of said display.

9. The electro-tactile panel apparatus according to claim 1, wherein said controller comprises a data receiver to retrieve the same image display data as the computer output to said display.

10. The electro-tactile panel apparatus according to claim 1, wherein said controller comprises a location mapping table controller to map the display data into cross-points of said first electrodes and said second electrodes of said electro-tactile panel.

11. The electro-tactile panel apparatus according to claim 10, wherein said controller comprises a tactile scanning controller, which generates tactile sensation data in response to the mapped display data by said location mapping table.

* * * * *